June 11, 1963  R. D. McLAUGHLIN ETAL  3,093,736
MULTIPLE PRISM OPTICAL SCANNER
Filed Dec. 21, 1959  2 Sheets-Sheet 1

INVENTORS
ROBERT D. MCLAUGHLIN
JOSEPH L. BORDEN
ROBERT M. LANDSMAN
BY
ATTORNEY

June 11, 1963  R. D. McLAUGHLIN ETAL  3,093,736
MULTIPLE PRISM OPTICAL SCANNER
Filed Dec. 21, 1959  2 Sheets-Sheet 2

*INVENTORS*
ROBERT D. MCLAUGHLIN
JOSEPH L. BORDEN
ROBERT M. LANDSMAN

ATTORNEY

United States Patent Office 3,093,736
Patented June 11, 1963

3,093,736
MULTIPLE PRISM OPTICAL SCANNER
Robert D. McLaughlin, South Norwalk, Robert M. Landsman, Norwalk, and Joseph L. Borden, Westport, Conn., assignors to The Perkin-Elmer Corporation, Norwalk, Conn., a corporation of New York
Filed Dec. 21, 1959, Ser. No. 862,438
9 Claims. (Cl. 250—83.3)

This invention relates to two dimensional scanning apparatus and, more particularly, to apparatus for scanning an area to detect infrared radiation.

One known method of optically scanning a given area is to utilize two prisms. A single rotating prism in the path of a ray of radiant energy causes the ray to be deflected in a circular path. Insertion of a second rotating prism into the optical path imparts a second degree of motion to the beam. The various effects obtained by the use of two optical prisms may best be visualized by imagining a single ray passing through one such prism and impinging on a screen as a spot. The projected spot may be assumed to lie at the end of a rotating vector, the other end of the vector being the optical axis of the instrument. The length of the vector is a function of the optical displacement produced by the geometry of the prism. The rotational velocity of the vector is the rotational velocity of the prism. Assume, then, that a second rotating prism is inserted into the ray either before or after it passes through the first prism. Since the second prism will also displace the spot by an amount that can be illustrated by a vector, the spot will move at the end of the resultant of two vectors rotating about a common point. If the vectors are assumed to be of equal length, the center of rotation is considered the zero point, and the arithmetic sum of their lengths is assumed to be unity, the spot will be seen to describe a spiral under certain conditions. Thus, when the vectors rotate in the same direction and the speed of one vector is just double the speed of the other, the spot will move in a single spiral from unity to zero in the time required for the faster vector to make one revolution. The difference between the velocities of the vectors determines the rate at which the spot will move from unity to zero. This may be denominated the "frame rate." After the spot has spiralled from one to zero, the rotating vectors will generate an expanding spiral from zero to one.

For scanning purposes it is desirable that the spot spiral inwardly quite slowly relative to its circumferential velocity. In this way a "tight" spiral can be achieved to provide complete coverage of a circular area. It may be demonstrated trigonometrically that the resultant of two concentric rotating vectors may be defined by the expression:

$$R = 2 \cos \frac{(\omega_1 - \omega_2)t}{2} \frac{(\omega_1 + \omega_2)t}{2}$$

where $\omega_1$ and $\omega_2$ are the rotational velocities of the vectors. This expression approximates the situation occurring in the apparatus of the invention. As the foregoing expression indicates, the "frame rate" is determined by the difference between the velocities while the rate of scan is determined by the average velocity.

For scanning applications such as military infrared systems, high orbital velocities are desirable due to such factors as limited retention time of viewing screens and resolution of fast-moving targets. Also, operation on 400 cycle aircraft power systems is often necessary, making high prism rotation speeds simplest and most economical to achieve. An eight pole synchronous motor having a speed of 6000 r.p.m. at 400 cycles is an especially convenient power source.

Attempts have been made in the past to achieve satisfactory scanning results by holding one prism stationary while rotating the other and by providing contra-rotating prisms. A major setback to such attempts has been the problem of the extremely high rotational speeds achieved by the individual bearing elements involved. For example, if a large-aperture, stationary inner prism supports a ball bearing on its periphery and the bearing, in turn, supports a rotating prism, it will be seen that rotating the outer race at 6000 r.p.m. will impose extremely high rolling speeds on the small balls between races. One solution to such a problem is to rotate the entire bearing while maintaining a differential velocity between the inner and outer races. However, the problems of physically rotating one large aperture optical prism at a high speed and rotating a second prism at a closely controlled speed very near that of the first have been but imperfectly solved up to the present time. Apparatus of this type known in the prior art have made use of such devices as gear trains and belts. The additional mechanical and optical problems introduced by such apparatus will be readily apparent.

It is, therefore, a primary object of the present invention to provide simple, reliable apparatus for multiple prism optical scanning. Other objects are to provide such apparatus capable of operating prisms at closely controlled but differing speeds without the use of gear trains or belts; of accurately controlling multiple prisms; and of providing such apparatus particularly adapted to the infrared scanning of target areas.

The above objects are achieved by providing radiant energy apparatus which comprises a hollow rotatable shaft having a substantially cylindrical first support member affixed to its end. A housing encircles the cylindrical first support member and a cylindrical second support member is interjacent the housing and the support member and overlaps the open end of the first support member. Bearing means are provided between the first and second support members to allow relative rotation between them. Means are provided for separately controlling the rotational velocity of the second support member. A first optical prism is supported by the open end of the first support member and a second optical prism is supported by the overlapping portion of the second support member. A fixed tubular support extends through the rotatable hollow shaft and has one end affixed to the housing. Optical focusing means are supported by the tubular support in position to receive the radiation passing through the prisms and direct the radiation through the tubular support. Radiation detector means are positioned to receive the focused radiation.

The apparatus of this invention will be more easily understood from the following detailed description, the appended claims, and the figures of the attached drawings wherein:

Figure 1:
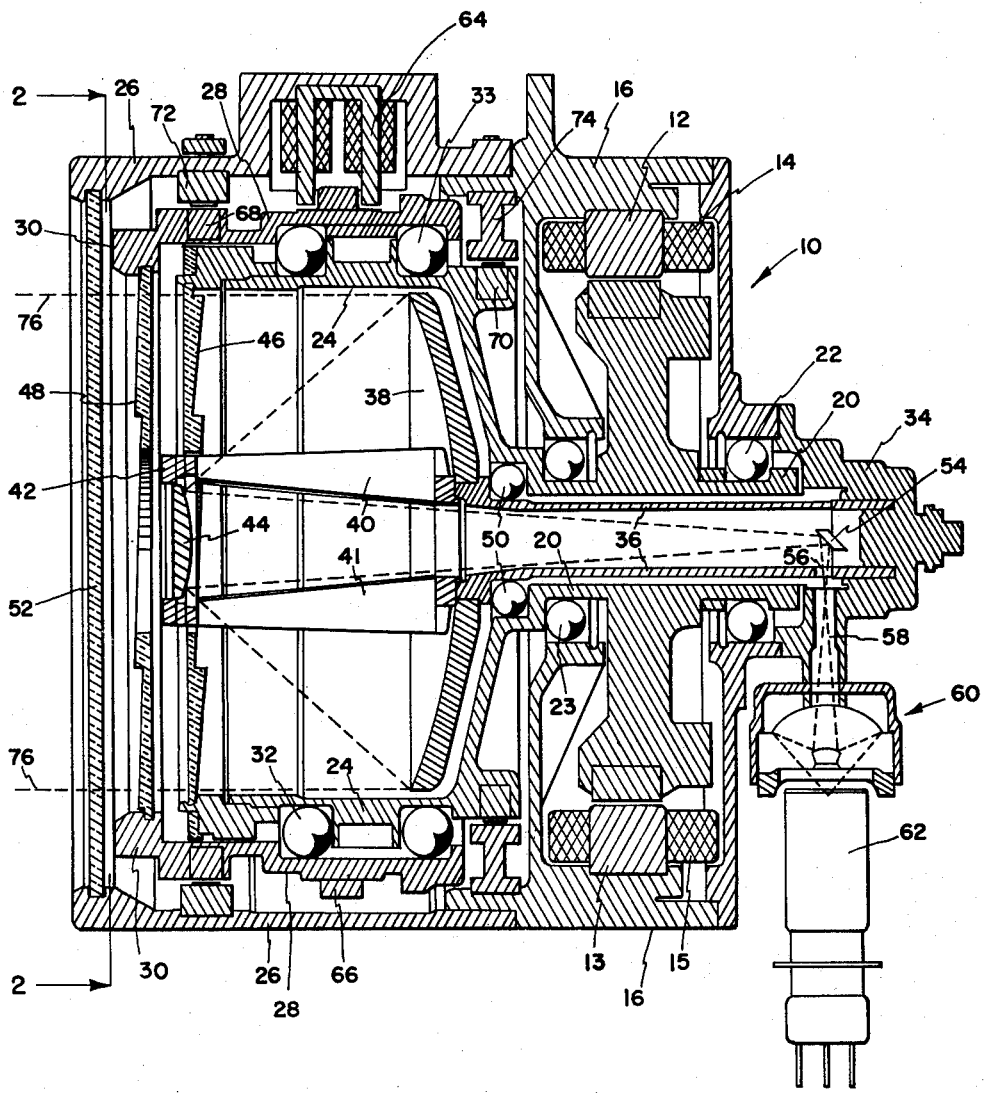
FIG. 1 is a cross-sectional elevational view of an apparatus embodying the invention.
Figure 2:
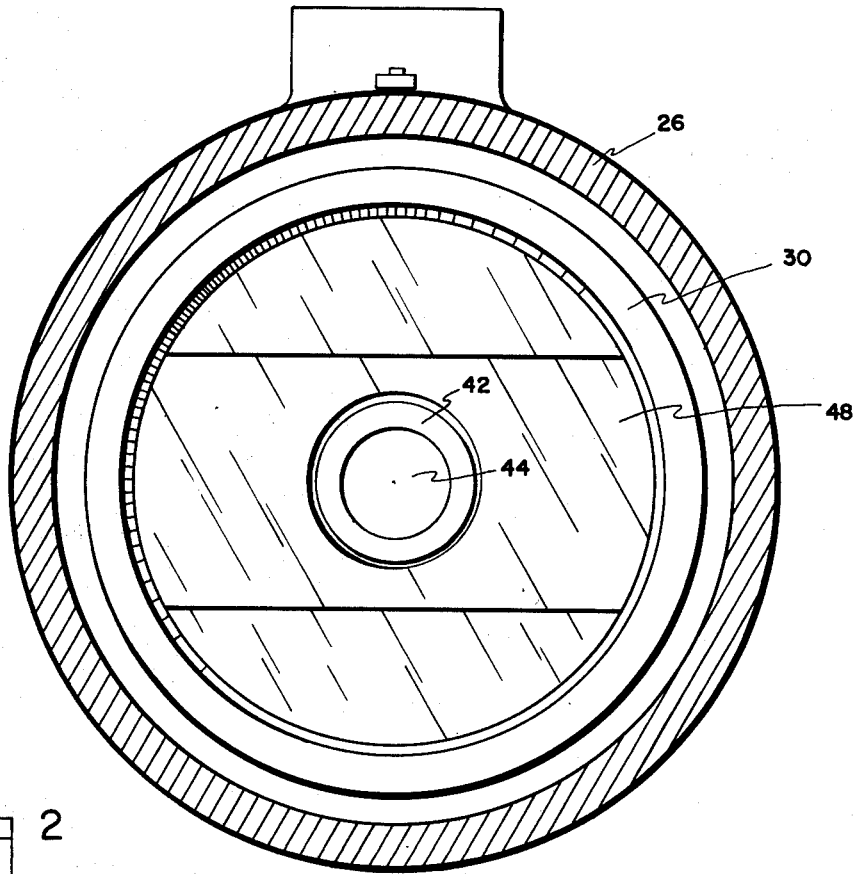
FIG. 2 is a cross-sectional view taken along the line 2—2 of FIG. 1.

Referring to FIGS. 1 and 2 of the drawings, an electric motor 10 is provided comprising stator poles 12 and 13 and stator windings 14 and 15 enclosed in a suitable housing 16. The rotating element of motor 10 is mounted on a hollow shaft 20 which rotates on suitable bearings 22 and 23. One end of shaft 20 extends from the motor housing and is provided with an enlarged, cup-shaped supporting member 24. Member 24 rotates within a cylindrical housing 26 which is physically attached to motor housing 16 to form a convenient unitary assembly.

Interjacent housing 26 and supporting member 24 is a second cylindrical supporting member 28 which has an edge 30 extending beyond support member 24. Relative motion between members 24 and 28 is permitted by bearings 32 and 33. A specific design for these bearings is disclosed in co-pending application Serial No. 860,507, filed December 18, 1959, now U.S. Patent No. 3,022,124, issued Feb. 20, 1962, by Joseph L. Borden.

End 34 of housing 16 fixedly supports stationary tube 36 within hollow shaft 20. The end of tube 36 supports a concave ellipsoidal reflector 38 within supporting member 24. Brackets 40 and 41 extend from tube 36 and are provided with an annular support 42 enclosing convex spheroidal reflector 44.

The open end of support member 24 supports a fresnelled prism 46 which has an annular configuration and fits around reflector 44 and its supporting brackets. The overlapping end 30 of member 28 supports a similar second prism 48. A bearing 50 between tube 36 and shaft 20 assists in maintaining mechanical and optical alignment. A window 52 in housing 26 encloses and protects the apparatus.

A plane mirror 54 is positioned in tube 36 to receive focused radiation and transmit it via passageways 56 and 58 and microscope objective 60 to a suitable detector 62.

The apparatus illustrated is designed for infrared scanning and operation from a 400 cycle electrical source. Synchronous motor 10 provides a rotational velocity of 6000 r.p.m. and directly drives shaft 20, member 24, and prism 46 at the same speed. Supporting member 28 and prism 48 are wholly supported by bearings 32 and 33 and, due to the slight friction of the bearings, would rotate at the same speed as member 24 in the absence of some type of retarding means. Prisms 46 and 48 for the infrared apparatus shown are poly-crystalline germanium coated with silicon monoxide (SiO) to provide peak transmission of $5\mu$ wavelength radiation. Germanium is used as the prism material because its high index of refraction allows a small prism angle, 4°38' for a 15° deviation, whereby the sine of the prism angle and the angle in radians are approximately the same. This approximation helps minimize the radial distortion normally associated with this type of scan. The prisms are stepped (fresnelled) to minimize the volume of germanium required and the dynamic balancing problems. To decrease stresses under the influence of centrifugal force, each prism is made up of two seminannular parts.

Outer stationary window 52 may be of any material having suitable strength and radiation transmission characteristics. In the described embodiment the window is arsenic trisulfide ($As_2S_3$).

As mentioned above, if no retarding forces were applied to cylindrical support 28, the two prisms would rotate at the same speed without achieving the desired scanning action. To prevent this, a D.C. electro-magnet 64 is positioned between housing 26 and support 28. The ends of magnet 64 straddle an aluminum ring 66 which encircles support 28. As aluminum ring 66 cuts the magnetic flux produced by magnet 64, eddy currents are produced within the ring which results in a torque opposing the rotation of the outer prism. By controlling the excitation of magnet 64, the amount of slip between prism 48 and synchronously rotating prism 46 may be accurately controlled.

In order to synchronize a display means, such as an oscilloscope, with the rotation of the prisms, small magnets 68 and 70 are embedded in prism supports 28 and 24. Magnets 68 and 70 act upon stationary pick-up coils 72 and 74 to provide indexing pulses.

It will now be seen that infrared radiations 76, entering the apparatus through window 52, passes first through prism 48 rotating at something less than synchronous speed and then through prism 46 operating at synchronous speed. The radiation then impinges on the objective comprising an f/.66 ellipsoidal reflector 38 and spherical convex mirror 44. The equivalent focal length of the combination is 43.72 inches and a four milliradian field is imaged as a spot 4.4 mm. in diameter. Reflecting microscope objective 60 utilizes two spherical mirrors to form an 8.8× reduced image at the detector. The energy from the four milliradian field is thus concentrated into a 0.5 mm. spot at the detector. In the disclosed embodiment an indium antimonide (InSb) detector is used. The electrical signal produced is amplified by suitable means and applied to a synchronized display device, such as a cathode ray oscilloscope.

Figure 3:
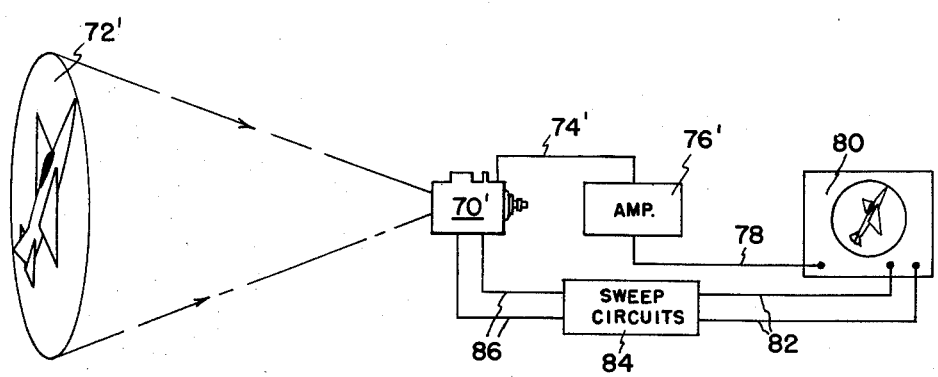
FIG. 3 is a schematic block diagram of a scanning system embodying the invention.

The manner in which a scanner of this type may be employed to produce a visual presentation will be apparent from FIG. 3. Scanner 70' of the type illustrated in FIGS. 1 and 2 is powered by a convenient source (not shown) and receives infrared radiation from a target area 72'. As target area 72' is spirally scanned, the detector output on conductor 74' will vary with the infrared radiation received. This output is amplified by amplifier 76' which may comprise as many stages as needed. The output of the amplifier is fed through line 78 to oscilloscope 80. In order to provide a spiral motion of the cathode ray spot, the horizontal and vertical plates are energized through conductors 82 from sweep circuits 84 receiving synchronizing pulses from scanner 70' over conductors 86.

It will be obvious to those skilled in the art that the problems inherent in prior art prism scanning devices are solved by this invention. The device is both compact and reliable. Bearings 32 and 33 will rotate only at the differential speed between elements 24 and 28.

As another advantage which may be derived from this invention, it will be noted that the compactness of design and distribution of the mass of the rotating parts of the scanner are similar to those of a gyroscope. Thus by relatively straightforward engineering of rotational speeds and mass distribution, and by appropriate gimballing, the apparatus can be made self-stabilizing.

It will be equally obvious that the scope of the invention is much broader than the described embodiment. The invention is not limited to the detection of infrared, for example, but is equally applicable to radiant energy of all wavelengths. Also, the selection of materials is dependent largely on the engineering relative to the particular wavelengths of interest and is not to be construed as limiting in any manner. Although the illustrated embodiment utilizes an A.C. synchronous motor in combination with an electro-magnetic retarding device, it will be obvious that many other control devices fall within the limits of this invention. For example, rather than a retarding device, the apparatus could employ two separate motors operating at different speeds. In such an event, aluminum ring 66 could be replaced by a rotor structure and electro-magnet 64 could be replaced by the required number of stator poles. It will also be clear that D.C. motors could be used and that the choice of prism and window materials depends upon the radiation to be scanned and upon the mechanical strength required.

We claim:

1. Radiant energy scanning apparatus which comprises a first substantially cylindrical hollow support member positioned to permit the passage of radiant energy therethrough and adapted to rotate about its axis of revolution; a second substantially cylindrical hollow support member coaxial with said first support member and adapted to rotate about said first support member; bearing means intermediate said first and second support members; first optical prism means supported by said first support member and positioned to pass radiation therethrough; second optical prism means supported by said second support member and positioned to pass radiation to said first prism means; radiation focusing means positioned to receive and focus radiation from said first and second prism means; radiation detector means positioned to receive the focused radiation; and driving means for rotating said first and second support members at different speeds.

2. Radiant energy scanning apparatus which comprises hollow driving shaft means; a first substantially cylindrical hollow support member supported by said shaft means and having its axis of rotation colinear with the longitudinal axis of said shaft; a second substantially cylindrical hollow support member coaxial with said first support member; bearing means interjacent said first and second support members for relative rotation therebetween; means for controlling the velocity of said second support member; first optical prism means supported by said first support means for rotation therewith, and positioned to admit radiation therethrough; second optical prism means supported by said second support means for rotation therewith, and positioned to pass radiation to said first prism means; optical focusing means adapted to pass radiation into said hollow shaft means; and radiation detector means adapted to receive the focused radiation.

3. Radiant energy scanning apparatus which comprises hollow driving shaft means; a first substantially cylindrical hollow support member supported by said shaft means and having its axis of rotation colinear with the longitudinal axis of said shaft; a second substantially cylindrical hollow support member coaxial with said first support member; bearing means interjacent said first and second support members for relative rotation therebetween; means for controlling the velocity of said second support member; first optical prism means supported by said first support means for rotation therewith, and positioned to admit radiation therethrough; second optical prism means supported by said second support means for rotation therewith, and positioned to pass radiation to said first prism means; housing means enclosing said first and second support means and said first and second prism means, said housing means being adapted to allow the passage of radiant energy through said first and second optical prism means; optical focusing means adapted to pass radiation into said hollow shaft means; and radiation detector means adapted to receive the focused radiation.

4. Radiant energy scanning apparatus which comprises hollow driving shaft means; a first substantially cylindrical hollow support member supported by said shaft means and having its axis of rotation colinear with the longitudinal axis of said shaft; a second substantially cylindrical hollow support member coaxial with said first support member; bearing means interjacent said first and second support members for relative rotation therebetween; means for controlling the velocity of said second support member; first optical prism means supported by said first support means for rotation therewith, and positioned to admit radiation therethrough; second optical prism means supported by said second support means for rotation therewith, and positioned to pass radiation to said first prism means; housing means enclosing said first and second support means and said first and second prism means, said housing means being adapted to allow the passage of radiant energy through said first and second optical prism means; elongated third support means affixed to said housing means and extending through said hollow driving shaft means to define a passage for radiant energy therethrough; optical focusing means supported by said third support means in parallel relationship with said first and second prism means and adapted to pass radiation into said passage; and radiation detector means adapted to receive the focused radiation.

5. Radiant energy scanning apparatus which comprises hollow, rotatable shaft means; a first cup-shaped support member affixed to the end of said shaft means, the base of said first support member defining an opening coaxial with the hollow portion of the hollow shaft means; housing means encircling the enlarged portion of said first support member; a second hollow cylindrical support member interjacent said housing means and said first support member and overlapping the open end of said first support member; bearing means between said first support member and said second support member to allow relative rotation therebetween; retarding means positioned to retard the rotational velocity of said second support member; first optical prism means supported by the open end of said first support member for the passage of radiant energy therethrough; second optical prism means supported by the overlapping portion of said second support member for the passage of radiant energy therethrough; fixed tubular support means extending through said hollow shaft means and having one end affixed to said housing means; optical focusing means supported by said tubular support means positioned to receive radiant energy passing through said first and second optical prism means and direct said radiation through said tubular support means; and radiation detector means positioned to receive the focused radiation.

6. Radiant energy scanning apparatus which comprises electrical motor means, the shaft of said motor means being hollow and having one end extending through the housing of said motor means; a first cup-shaped support member affixed to the extended end of said shaft, the base of said first support member defining a hole coaxial with the hollow portion of the hollow shaft means; housing means enclosing the enlarged portion of said first support member; a second cylindrical support member interjacent said housing means and said first support member and overlapping the open end of said first support member; bearing means between said first support member and said second support member to allow relative rotation therebetween; retarding means between said housing means and said second support member to retard the rotational velocity of said second support member; first optical prism means supported by the open end of said first support member for the passage of radiant energy therethrough; second optical prism means supported by the overlapping portion of said second support member for the passage of radiant energy therethrough; tubular support means extending through the hollow shaft of said motor means and affixed to the housing of said motor by one end; concave annular reflector means supported within the enlarged portion of said first support member by the unaffixed end of said tubular support means and adapted to receive and focus radiant energy passing through said first and second optical prism means; convex reflector means positioned to receive the reflected radiation from said concave reflector means to direct said radiation through the central hole of said annular reflector means and said tubular support means; and radiation detector means positioned to receive the reflected radiation.

7. Radiant energy scanning apparatus which comprises electrical motor means, the shaft of said motor means being hollow; a cup-shaped first support member affixed at its base to one end of said shaft, the axis of symmetry of said first support member being co-linear with the longitudinal axis of said shaft and a continuation thereof, the base of said first support member defining an opening in alignment with the hollow portion of said motor shaft means; a hollow cylindrical second support member coaxial with and encircling said first support member, one end of said second support member overlapping the open end of said first support member; bearing means interjacent said first and second support members to permit relative rotation therebetween; a raised circumferential strip of relatively highly electrically conductive material encircling said second support member in a plane perpendicular to its axis of rotation; housing means enclosing said first and second support members and said electric motor means; magnetic flux producing means on said housing means positioned to apply a magnetic field across a portion of said raised strip to retard the rotation of said second support member; first optical prism means supported by the open end of said first support member in a plane substantially perpendicular to the axis of rotation of said first support member; second optical prism means supported by the overlapping edge of said second support member in a plane substantially parallel to the plane of said first optical prism means; window means in said housing means positioned to allow radiant energy to pass through both of said first and second optical prism means; fixed tubular support means extending through said hollow shaft means and having its longitudinal axis coincident with the axis of rotation thereof; annular concave reflector means supported by said fixed tubular support means and positioned within said cup-shaped first support member adjacent the base thereof to receive and focus radiation from said optical prism means; fixed reflector support means extending from said tubular support means substantially parallel to the axis of rotation of said first support member; convex reflector means supported normal to the axis of said first support member by said fixed reflector support means to receive the focused radiation from said concave reflector means and transmit said radiation through said tubular support means; plane reflector means positioned in said tubular support means to receive and deflect the radiation therethrough; passage defining means in the wall of said fixed tubular support means for the passage of the deflected radiation therethrough; optical magnification means positioned to receive and magnify the deflected radiation; and radiation detector means positioned to receive the magnified radiation.

8. The apparatus of claim 7 wherein said optical prism means are germanium, said window is adapted to transmit infrared radiation, and said detector is sensitive to infrared radiation.

9. Radiant energy scanning apparatus which comprises a first substantially cylindrical hollow support member positioned to permit the passage of radiant energy therethrough and adapted to rotate about its axis of revolution; a second substantially cylindrical hollow support member coaxial with said first support member and adapted to rotate about said first support member; bearing means intermediate said first and second support members; first optical prism means supported by said first support member and positioned to pass radiation therethrough; second optical prism means supported by said second support member and positioned to pass radiation to said first prism means; radiation focusing means positioned to receive and focus radiation from said first and second prism means; radiation detector means positioned to receive the focused radiation and produce electrical signals proportional thereto; driving means for rotating said first and second support members at different speeds; visual display means responsive to an electrical input; and electrical circuit means adapted to receive signals from said detector means and produce a display on said visual display means.

References Cited in the file of this patent
UNITED STATES PATENTS

| | | |
|---|---|---|
| 2,378,937 | Leeds | June 26, 1945 |
| 2,713,637 | Wuerth et al. | July 19, 1955 |
| 2,719,921 | Cairnes | Oct. 4, 1955 |
| 2,873,381 | Lauoresch | Feb. 10, 1959 |
| 2,924,824 | Lanctot et al. | Feb. 9, 1960 |
| 2,930,255 | Bryson | Mar. 29, 1960 |
| 2,968,735 | Kaufold et al. | Jan. 17, 1961 |
| 2,975,668 | Eckel | Mar. 21, 1961 |
| 3,000,255 | Iddings | Sept. 19, 1961 |